(12) United States Patent
Pan et al.

(10) Patent No.: US 10,811,046 B2
(45) Date of Patent: Oct. 20, 2020

(54) AIR-BEARING SURFACE (ABS) DESIGN TO REDUCE PARTICLE SCRATCH RISK

(71) Applicants: SAE Magnetics (H.K.) Ltd., Shatin, N.T. (HK); Headway Technologies, Inc., Milpitas, CA (US)

(72) Inventors: Ben Ng Kwun Pan, Hong Kong (HK); Ellis Cha, San Ramon, CA (US)

(73) Assignees: SAE Magnetics (H.K.) Ltd., Shatin, N.T. (HK); Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/033,570

(22) Filed: Jul. 12, 2018

(65) Prior Publication Data
US 2020/0020355 A1    Jan. 16, 2020

(51) Int. Cl.
*G11B 5/60* (2006.01)
*G11B 21/21* (2006.01)
*G11B 5/48* (2006.01)
*G11B 19/20* (2006.01)

(52) U.S. Cl.
CPC ............ *G11B 5/6082* (2013.01); *G11B 21/21* (2013.01); *G11B 5/4826* (2013.01); *G11B 19/2009* (2013.01)

(58) Field of Classification Search
CPC ....................................... G11B 5/6082
USPC ........................................ 360/235.6, 236.4
See application file for complete search history.

(56) References Cited

U.S. PATENT DOCUMENTS

| | | | | |
|---|---|---|---|---|
| 6,055,127 A | * | 4/2000 | Boutaghou | G11B 5/6005 360/236 |
| 6,683,755 B2 | * | 1/2004 | Koishi | G11B 5/60 360/235.6 |
| 6,920,015 B2 | * | 7/2005 | Mundt | G11B 11/1058 360/235.6 |
| 6,980,399 B2 | * | 12/2005 | Rajakumar | G11B 5/6005 360/235.5 |
| 7,106,556 B2 | * | 9/2006 | Pendray | G11B 5/54 360/235.8 |
| 7,643,251 B1 | * | 1/2010 | Zhang | G11B 5/6005 360/235.6 |
| 7,719,794 B2 | * | 5/2010 | Hanyu | G11B 5/6005 360/235.6 |
| 7,760,468 B2 | | 7/2010 | Cha et al. | |

(Continued)

FOREIGN PATENT DOCUMENTS

| | | | | |
|---|---|---|---|---|
| JP | 4136818 B2 | * | 8/2008 | ........... G11B 5/6005 |
| JP | 2012014785 A | * | 1/2012 | ........... G11B 5/6082 |

OTHER PUBLICATIONS

"Modeling and Simulation of Hard Particle Interaction in Head/Disk Interfaces," by Qinghua Zeng et al., TMRC 2004, Boulder, Colorado, Aug. 11-13, 2004, Paper C5, pp. 1-6.

*Primary Examiner* — William J Klimowicz
(74) *Attorney, Agent, or Firm* — Saile Ackerman LLC; Stephen B. Ackerman

(57) ABSTRACT

A slider design for a hard disk drive (HDD) features a shallow cavity adjacent to a leading edge that has patterns of sub-cavities of various shapes etched into its base to reduce its original surface area. The presence of these patterns of sub-cavities significantly reduces the probability that the slider will capture particles on the surface of a rotating disk and thereby reduces the corresponding probability of surface scratches that such captured particles inevitably produce.

14 Claims, 5 Drawing Sheets

(56) References Cited

U.S. PATENT DOCUMENTS

| | | | |
|---|---|---|---|
| 7,978,435 B2 * | 7/2011 | Hanyu | G11B 5/6005 |
| | | | 360/235.6 |
| 8,139,323 B2 | 3/2012 | Huha et al. | |
| 8,184,405 B1 * | 5/2012 | Zheng | G11B 5/6082 |
| | | | 360/266.3 |
| 8,199,437 B1 * | 6/2012 | Sun | G11B 5/6082 |
| | | | 360/235.6 |
| 8,488,278 B2 * | 7/2013 | Kunkel | G11B 5/6082 |
| | | | 360/236.7 |
| 8,493,688 B2 | 7/2013 | Ambekar et al. | |
| 8,810,967 B2 * | 8/2014 | Ramakrishnan | G11B 5/6082 |
| | | | 360/235.5 |
| 9,093,098 B2 * | 7/2015 | Rajasekharan | G11B 5/6005 |
| 9,230,587 B1 * | 1/2016 | Hu | G11B 5/6082 |
| 9,431,044 B1 * | 8/2016 | Sun | G11B 5/6082 |
| 9,940,960 B2 * | 4/2018 | Cha | G11B 5/6082 |
| 10,249,334 B1 * | 4/2019 | Hu | G11B 5/40 |
| 2002/0012199 A1 | 1/2002 | Polycarpou et al. | |
| 2003/0165031 A1 | 9/2003 | Rajakumar | |
| 2008/0144221 A1 * | 6/2008 | Hanyu | G11B 5/6005 |
| | | | 360/235.5 |

* cited by examiner

AIR-BEARING SURFACE (ABS) DESIGN TO REDUCE PARTICLE SCRATCH RISK

BACKGROUND

1. Technical Field

This disclosure relates to magnetic write heads that write on magnetic recording media, particularly to the air-bearing surface (ABS) topography of such write heads and methods to improve their performance.

2. Description

Magnetic hard disk drives (HDD) store data onto one or more rotating disks. The data is recorded and retrieved by magnetic head elements. Each magnetic head element is embedded onto a small slider which is "flown" on top of the rotating disks with spacing less than 10 nm. The spacing is maintained by a self-acting air bearing layer which is formed between the rotating disk and the air bearing surface (ABS) etched onto the adjacent slider surface. Small size debris and other contaminants inside HDD can pass under or be trapped within the ABS scratching the disks and causing data loss. Debris may appear from external sources or can be generated due to the movement of the HDD parts, which is not preventable.

There have been attempts in the prior art to address this problem, such as US Published Patent Appl. US2003/0165031 to Rajakumar and US Published Patent Appl. 2002/0012199 to Polycarpou, but neither of these approaches have resolved the issues satisfactorily. Therefore, the HDD industry is still in need of an ABS design that lowers the probability of scratching the disk even when debris presents inside HDD. For a more detailed analysis, based on modeling and simulation using two models, of the various mechanisms by which a captured particle actually interacts with a disk surface, the reader is directed to "Modeling and Simulation of Hard Particle Interaction in Head/Disk Interfaces," by Qinghua Zeng et al., TMRC 2004, Boulder Colo., Aug. 11-Aug. 13, 2004, Paper C5. Unlike the present disclosure, this paper does not provide slider designs to mitigate these effects.

SUMMARY

The object of this disclosure is to fabricate a slider with an ABS topography that will eliminate or strongly mitigate the problem of particle capture and potential disk damage during HDD operation.

This object will be achieved by a topographical design of a slider ABS that will include various patterns etched into the base of a shallow region at the leading edge of the slider ABS.

FIG. 1 shows a schematic illustrative example of a prior-art slider ABS. The horizontal cross-sectional shape, as seen looking up from a disk, is bounded peripherally at the left 10 by a "leading edge (LE)" which is the edge towards which disk rotation (and air flow) is directed. The right edge 20 is termed the "trailing edge (TE)". The surface topography is designed so that the flow of air between the surface and the disk creates pressure gradients that maintain aerodynamic stability and flying height between the ABS of the slider and disk surface as the slider moves radially across the disk surface and encounters velocity gradients in the air flow.

Different shadings represent steps (planar regions) at different depths formed by etching through the original planar ABS surface of the slider body. Densest shadings indicate depths closest to the surface and the unshaded area is the deepest area. Those steps, by increasing order of depth, are the original ABS surface itself, with the densest shadings 30, 31, 32, 33 (note, 30, 31, 32 and 33 are all the same depth, but located at different positions on the slider), the shallow (minimal depth) steps 40, 41, 42, 43 (same depth, same less dense shading, but different locations) and deeper cavities 50, 60, 70 (other, different, less dense shadings). The "spacing" of the steps (i.e., the vertical distance between the disk surface and the steps, which is the sum of the flying height plus the depth of the steps) of leading edge (LE) shallow step (or "cavity") 40 can be adjusted by varying the depth of the shallow step. Thus "spacing" is a dynamic quantity, while depth is not. Note that the simulations shown herein were generated with the fly height at the position of the read/write element being at 11.3+/−0.1 nm. Simulations showed high particle scratch probability occurs with particle size at the same dimensional regime as the depth of LE shallow step (FIG. 2). Further, the graphical results of FIGS. 1, 3 and 4 indicate that the correlation between the area of the LE shallow region (40) and the 180 nm particle size scratch probability, for the three sliders represented in the graphs, is very strong, which indicates that the area of the LE shallow region 40 is the primary contributor to particle capture, while the pattern shape, e.g., circles or slots, is of much less importance. Note that the dimensions of the shallow step 40 is approximately 650 μm×125 μm.

Varying the depth of the patterns to have a deeper step (approximately 1.5X the original step depth) produces a similar particle capture probability. However, an examination of FIG. 2 indicates that the deeper the shallow region is, the greater is the peak risk for the capture of larger size particles, so simply varying a fixed depth of the shallow region would only enable control on different particle sizes. This also indicates that the presence of patterns provides a means of having more effect on a variety of particle sizes.

DETAILED DESCRIPTION

Figure 2:
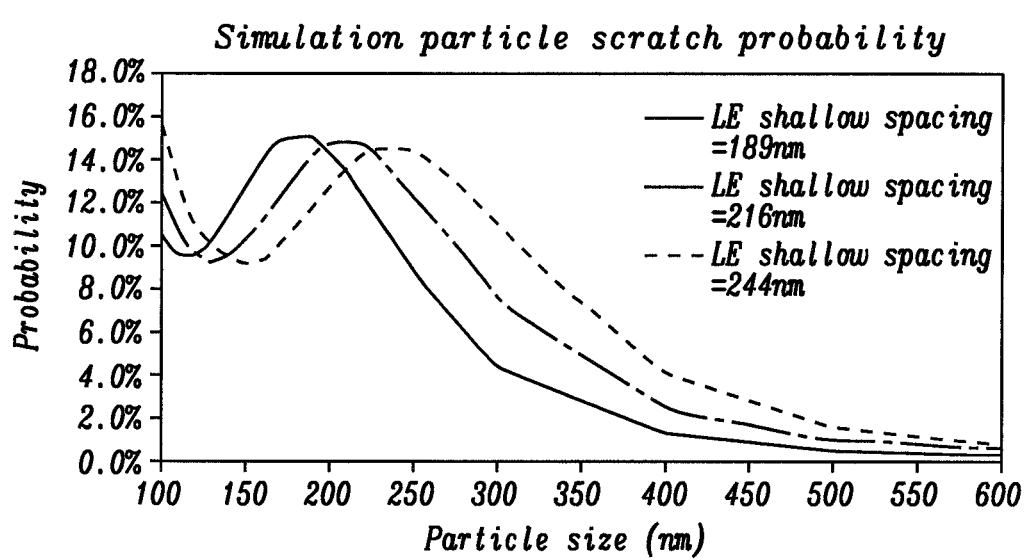
FIG. 2 is a graphical representation of the results of a series of simulations that relate particle scratch probabilities to the depth of a shallow region in the leading edge (LE) portion of the slider ABS design shown in FIG. 1.

The problem of eliminating particle scratch risk is addressed herein by a modification of the topography of a shallow region 40 within the slider ABS immediately adjacent to the leading edge of the slider periphery. Simulations, as shown in FIG. 2, show that the depth of this region has an important effect on the probability of particle scratches of the surface of a rotating magnetic disk. Specifically, as the spacing of the shallow region is increased from 189 nm to 244 nm the particle scratch probability peak shifts towards larger size particles, but the height of the peak remains approximately constant. This indicates that the depth of the shallow region does not increase capture probability, but only shifts capture probability to different sized particles.

Figure 1:
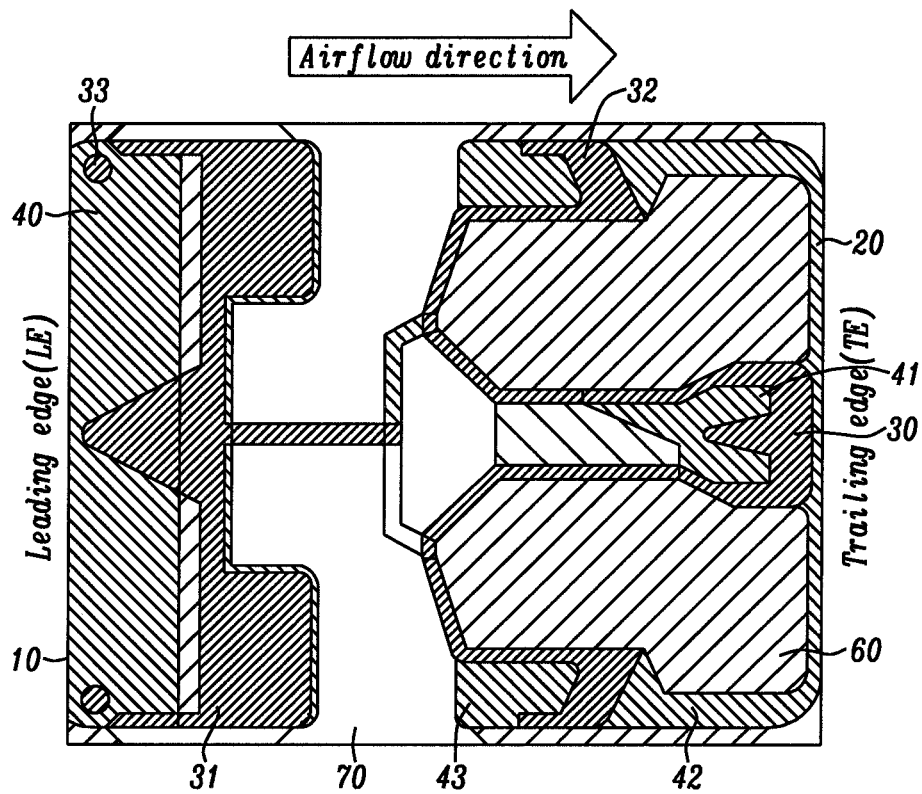
FIG. 1 is a schematic representation of the ABS topology of an exemplary prior art slider showing structures etched into the surface at the leading edge (LE) and trailing edge (TE) sides; etch depths are indicated by the density of the shadings.
Figure 3:
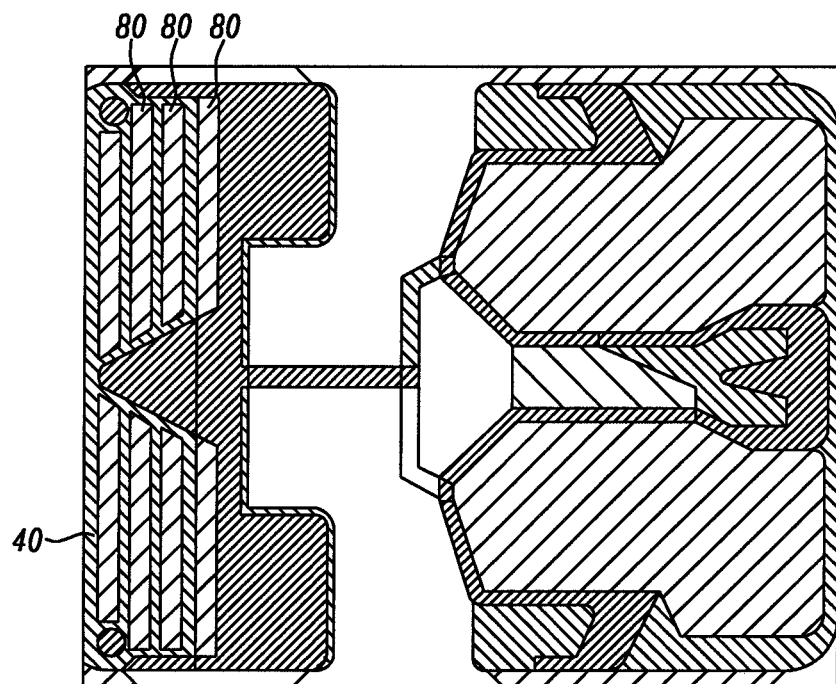
FIG. 3 is the same exemplary slider illustrated in FIG. 1, now showing that the shallow etched region at the LE has been modified by the addition of a series of slots, parallel to the LE.
Figure 4:
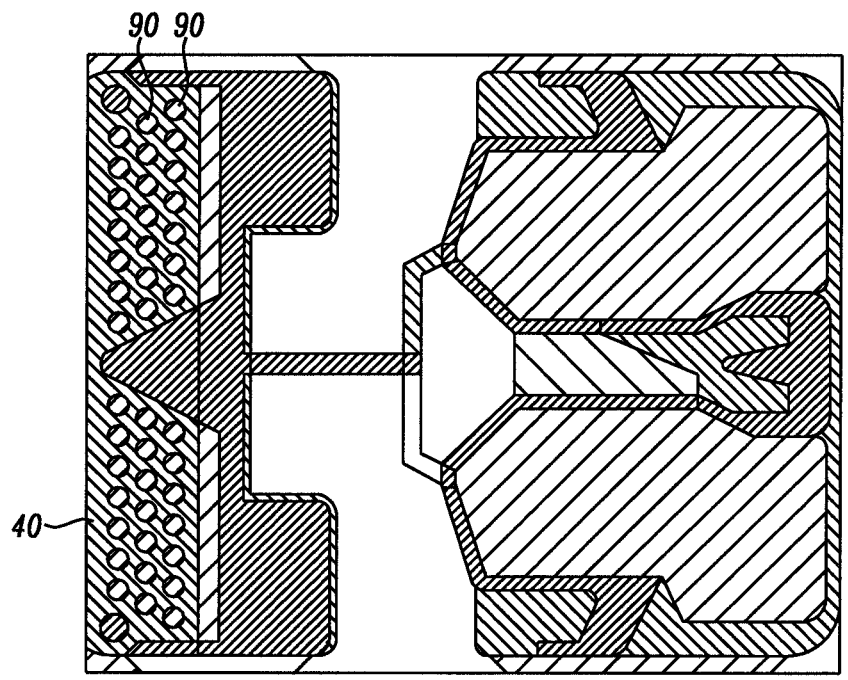
FIG. 4 is the same exemplary slider illustrated in FIG. 1, now showing that the shallow etched region at the LE has been modified by the addition of a series of circles etched in lines parallel to the LE.

Further, the graphical results of FIGS. 1, 3 and 4 indicate that the correlation between the area of the LE shallow region (40) and 180 nm particle size scratch probability for the three sliders shown is very strong, which indicates that the area of the LE shallow region 40 is the primary contributor to particle capture, while the pattern shape, e.g., circles or slots, is of much less importance. However, it is possible that different pattern geometries may contribute to the ejection of captured particles of various shapes. Note that the dimensions of the approximately rectangular horizontal cross-section of the shallow step 40 is approximately 650 µm×125 µm.

Varying the depth of the patterns to have a deeper step (approximately 1.5X the original depth) produces a similar particle capture probability. However, an examination of FIG. 2 indicates that the deeper the shallow region is, the greater is the peak risk for the capture of larger size particles, so simply varying a fixed depth of the region would only enable control on different particle sizes. This also indicates that the presence of patterns offers more effect on a variety of particle sizes.

As shown in FIGS. 3 and 4, which in all other respects are identical to FIG. 1, we were therefore led to modify the surface area of the LE shallow etched region 40 by etching arbitrary patterns of sub-cavities of greater depth into the base of that region, thereby reducing its original surface area. Etching arbitrary patterns into the LE shallow region reduced the area of LE shallow region (although adding some area to the regions etched therein) and reduced particle scratch probability. Two examples of patterns that meet the objectives are shown in FIG. 3 (narrow slots) 80 and FIG. 4 (arrays of circles) 90.

Figure 5:
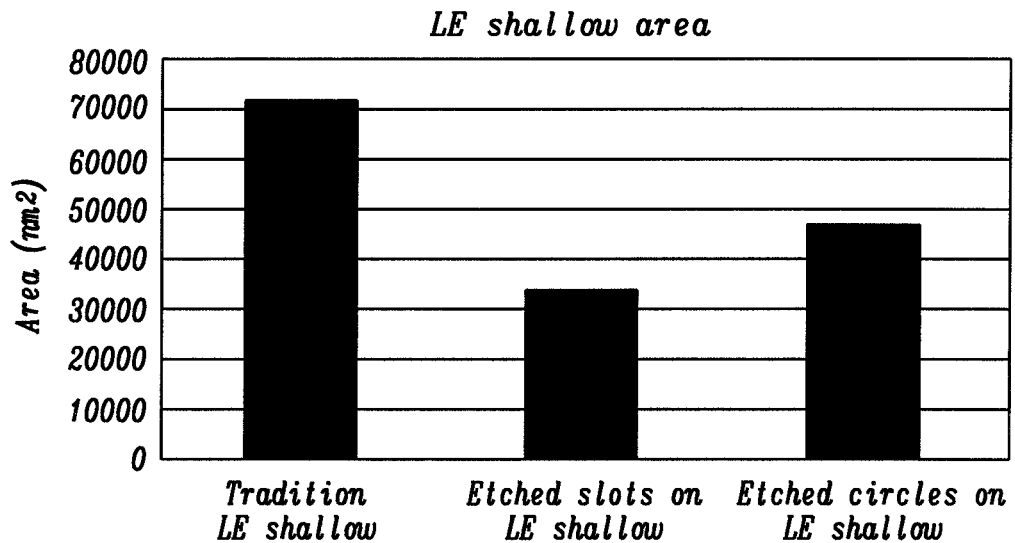
FIG. 5 is a graphical histogram indicating the change (reduction) in the area of the shallow region produced by the addition of deeper slots or circles.
Figure 6:
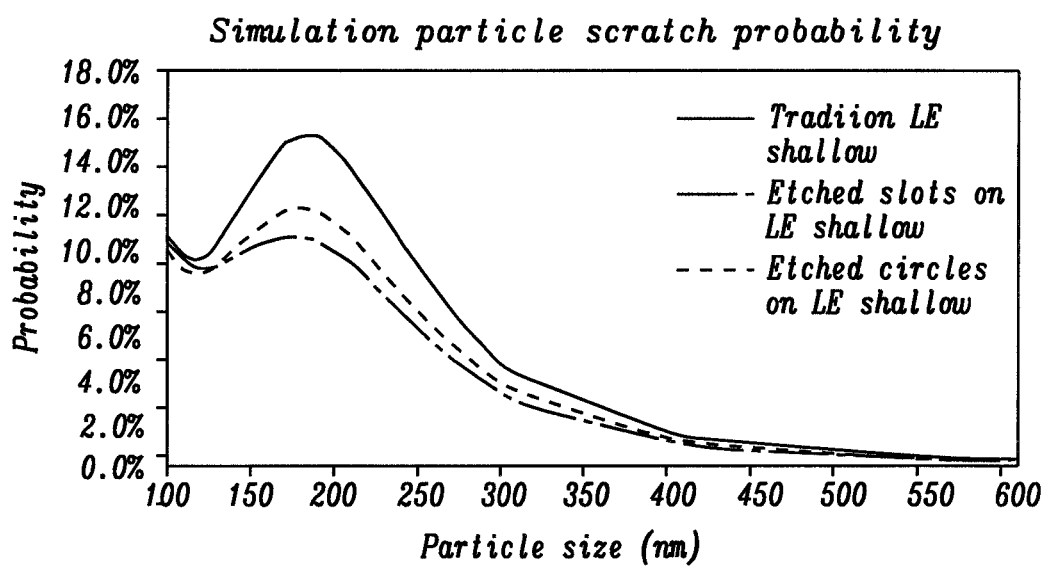
FIG. 6 is a graphical representation of a series of simulations that relate particle scratch probabilities to the presence of arbitrary patterns etched into the shallow region. The specific effects of the etched slots and etched circles of FIGS. 3 and 4 as compared to no additional pattern are shown.

FIG. 5 graphically shows the LE shallow area comparison between the ABS shown in FIG. 1 (traditional, unetched LE shallow region), FIG. 3 (etched slots on LE shallow region) and FIG. 4 (etched circles on LE shallow region). These differences are the result of portions of the original shallow area being removed by the presence of the deeper patterns of sub-cavities etched into the shallow area base. As FIG. 5 shows, the amount by which the original surface area of the shallow cavity is reduced ranges between approximately 50% for the slots, to approximately 35% for the circles. The effects of these patterns on the reduction of the surface area of the LE shallow region 40 has already been discussed above, namely that the primary beneficial effect on particle capture is a result of the surface area reduction of the LE shallow region produced by the introduction of these patterns into the base of the LE shallow region, not by the pattern geometry or depth per se. We now indicate how the present sliders are introduced into an operational hard disk drive.

Figure 7:
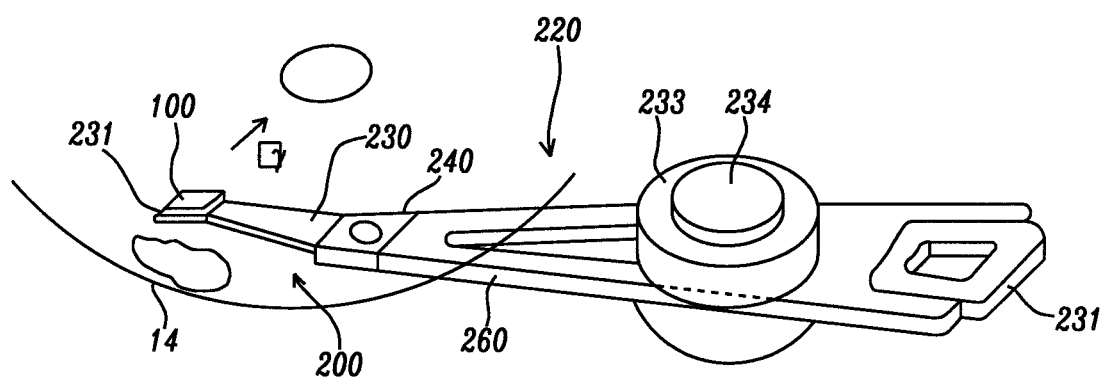
FIG. 7 schematically shows a perspective view of a head arm assembly of the present recording apparatus.

FIG. 7 shows a head gimbal assembly (HGA) 200 that includes the mounted slider described herein 100 and a suspension 220 that elastically supports the mounted slider 100. The suspension 220 has a spring-like load beam 230 made with a thin, corrosion-free elastic material like stainless steel. A flexure 231 is provided at a distal end of the load beam and a base-plate 240 is provided at the proximal end. The mounted slider 100 is attached to the load beam 230 at the flexure 231 which provides the mounted slider with the proper amount of freedom of motion. A gimbal part for maintaining the mounted slider 100 at a proper level is provided in a portion of the flexure 231 on which the mounted slider 100 is mounted.

A member to which the HGA 200 is mounted to arm 260 is referred to as head arm assembly 220. The arm 260 moves the mounted slider 100 in the cross-track direction y across the medium 14 (here, a hard disk). One end of the arm 260 is mounted to the base plate 240. A coil 231 to be a part of a voice coil motor is mounted to the other end of the arm 260. A bearing part 233 is provided to the intermediate portion of the arm 260. The arm 260 is rotatably supported by a shaft 234 mounted to the bearing part 233. The arm 260 and the voice coil motor that drives the arm 260 configure an actuator.

Figure 8:
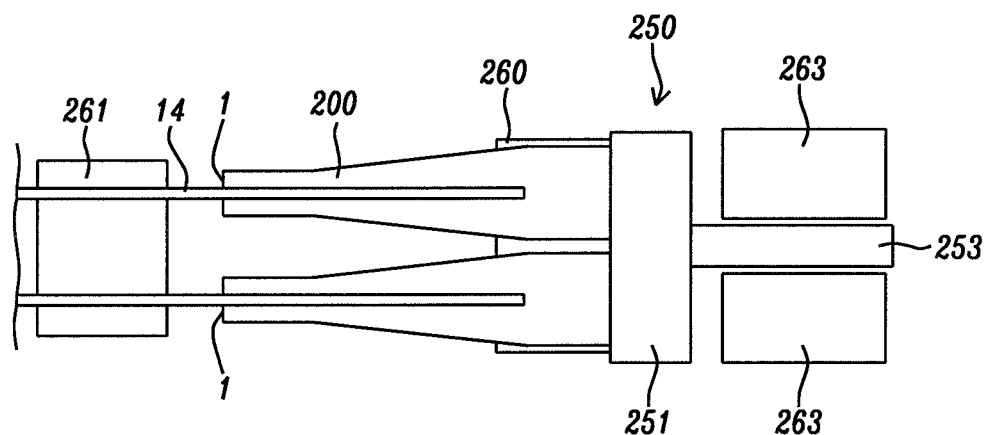
FIG. 8 schematically shows a side view of a head stack assembly of the present recording apparatus.
Figure 9:
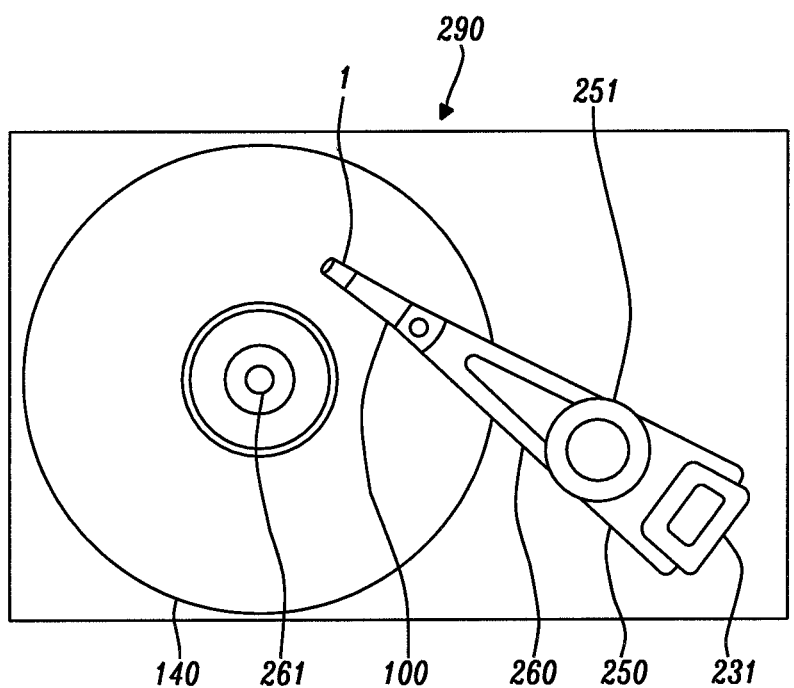
FIG. 9 schematically shows a plan view of the magnetic recording apparatus within which are mounted the components shown if FIGS. 7 and 8.

Referring next to FIG. 8 and FIG. 9, there is shown a head stack assembly and a magnetic recording apparatus in which the mounted slider 100 is contained. The head stack assembly is an element to which the HGA 200 is mounted to arms of a carriage having a plurality of arms. FIG. 8 is a side view of this assembly and FIG. 9 is a plan view of the entire magnetic recording apparatus.

A head stack assembly 250 has a carriage 251 having a plurality of arms 260. The HGA 200 is mounted to each arm 260 at intervals to be aligned in the vertical direction. A coil 231 (see FIG. 7), which is to be a portion of a voice coil motor is mounted at the opposite portion of the arm 260 in the carriage 251. The voice coil motor has a permanent magnet 263 arranged at an opposite location across the coil 231.

Referring finally to FIG. 9, the head stack assembly 250 is shown incorporated into a magnetic recording apparatus 290. The magnetic recording apparatus 290 has a plurality of magnetic recording media 14 mounted on a spindle motor 261. Each individual recording media 14 has two perpendicular magnetic recording (PMR) elements (although other types are possible) 100 arranged opposite to each other across the magnetic recording media 14 (shown clearly in FIG. 7). The head stack assembly 250 and the actuator (except for the PMR writer itself) act as a positioning device and support the mounted slider 100. They also position the PMR writers correctly opposite the media surface in response to electronic signals. The PMR records information onto the surface of the magnetic media by means of the magnetic pole contained therein.

As is understood by a person skilled in the art, the present description is illustrative of the present disclosure rather than limiting of the present disclosure. Revisions and modifications may be made to methods, materials, structures and dimensions employed in forming and providing a HDD-mounted slider having an ABS topography that eliminates risk of particle scratches by varying the topography of a particular region of that topography, while still forming and providing such a device and its method of formation in accord with the scope of the present disclosure as defined by the appended claims.

What is claimed is:

1. slider for a hard-disk drive (HDD) comprising:
   a slider body of substantially rectangular horizontal cross-section having a leading edge (LE), a trailing edge (TE) parallel to said leading edge and parallel sides extending from said leading edge to said trailing edge to define a rectangular periphery of said horizontal cross-section and an upper surface defining an air-bearing surface (ABS);
   a multiplicity of cavities formed in said slider body, wherein said cavities are formed with substantially planar bases at different depths relative to said ABS and wherein said cavities include a cavity of minimal depth and transversely symmetric cross-section formed immediately adjacent to and parallel to said leading edge and extending transversely across said slider ABS; wherein
   said cavity of minimal depth has a multiplicity of sub-cavities etched through the planar base thereof, said sub-cavities having cross-sectional shapes and areas that are etched into said planar base; said multiplicity of sub-cavities extending both transversely and longitudinally with respect to said slider body; wherein
   said sub-cavities form a uniform pattern whose presence reduces the total base area of said cavity of minimal depth.

2. The slider of claim 1 wherein said multiplicity of sub-cavities is an array of parallel transverse rectangular slots of uniform length, width and depth.

3. The slider of claim 2 wherein said multiplicity of uniform slots reduces the surface area of said original cavity base to approximately 30000 $\mu m^2$.

4. The slider of claim 1 wherein said minimal depth cavity has a base area of approximately 70,000 $\mu m^2$.

5. The slider of claim 1 wherein said minimal depth cavity has horizontal dimensions of approximately 650 $\mu m \times 125$ $\mu m$.

6. The slider of claim 1 wherein said multiplicity of sub-cavities are formed with arbitrary horizontal cross-sectional shapes, including circles, squares, diamonds or rectangles.

7. A head gimbal assembly, comprising the slider of claim 1;
   a suspension that elastically supports said slider, wherein said suspension has a flexure to which said slider is joined, a load beam with one end connected to said flexure and a base plate connected to the other end of said load beam.

8. A magnetic recording apparatus, comprising:
   the head gimbal assembly-mounted slider of claim 7;
   a magnetic recording medium positioned opposite to said slider;
   a spindle motor that rotates and drives said magnetic recording medium;
   a device that supports said slider and that positions said slider relative to said magnetic recording medium.

9. A method to reduce surface scratching of a disk during hard disk drive (HDD) operation comprising:
   providing said HDD with an operational slider having a body of substantially rectangular horizontal cross-section, wherein said slider has a leading edge (LE), a trailing edge (TE) parallel to said leading edge and parallel sides extending from said leading edge to said trailing edge to define a rectangular periphery of said horizontal cross-section and an upper surface defining an air-bearing surface (ABS); wherein said slider further includes
   a multiplicity of cavities formed in said slider body, wherein said cavities are formed with substantially planar bases at different depths relative to said ABS and wherein said cavities include a transversely symmetric cavity of minimal depth and formed immediately adjacent to and parallel to said leading edge and extending transversely across said slider ABS; wherein
   said cavity of minimal depth includes a multiplicity of sub-cavities formed therein, the sub-cavities having cross-sectional shapes and areas that are etched into said planar base; said multiplicity of sub-cavities extending both transversely and longitudinally with respect to said slider body and forming a regular pattern therein; whereby
   the presence of said pattern of sub-cavities reduces the total base area of said cavity of minimal depth and thereby reduces the probability of capturing and trapping particles of a wide variety of sizes on the surface of a rotating disk operationally positioned adjacent to said slider and thereby eliminates the problem of scratching said disk surface by trapped particles.

10. The method of claim 9 wherein said pattern of sub-cavities is an array of parallel transverse rectangular slots of uniform length, width and depth.

11. The method of claim 10 wherein said pattern of uniform slots reduces the surface area of said original cavity base to approximately 30000 $\mu m^2$.

12. The method of claim 9 wherein said minimal depth cavity has an area of approximately 70,000 $\mu m^2$.

13. The method of claim 9 wherein said pattern of sub-cavities are formed with arbitrary horizontal cross-sectional shapes, including circles, squares, diamonds or rectangles.

14. The method of claim 9 wherein said minimal depth cavity has horizontal dimensions of approximately 650 $\mu m \times 125$ $\mu m$.

* * * * *